(12) United States Patent
Funaki et al.

(10) Patent No.: US 6,657,166 B2
(45) Date of Patent: Dec. 2, 2003

(54) SILICON NITRIDE SINTERED MATERIAL AND PRODUCTION PROCESS THEREOF

(75) Inventors: Kouji Funaki, Gifu (JP); Katsura Matsubara, Aichi (JP); Hiroki Watanabe, Gifu (JP); Masaya Ito, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 63 days.

(21) Appl. No.: 10/092,518

(22) Filed: Mar. 8, 2002

(65) Prior Publication Data

US 2002/0175155 A1 Nov. 28, 2002

(30) Foreign Application Priority Data

Mar. 9, 2001 (JP) ........................................ 2001-067323

(51) Int. Cl.$^7$ ................................................. F23Q 7/00
(52) U.S. Cl. .................. 219/270; 123/145 A; 501/97.2
(58) Field of Search ................................ 219/270, 544, 219/553; 123/145 A, 145 R; 501/97.2

(56) References Cited

U.S. PATENT DOCUMENTS

| | | | | |
|---|---|---|---|---|
| 5,096,859 A | * | 3/1992 | Sakai et al. .................... | 501/92 |
| 5,177,038 A | * | 1/1993 | Takahashi et al. ............ | 501/92 |
| 5,238,882 A | * | 8/1993 | Takahashi et al. ............ | 501/92 |
| 5,523,267 A | * | 6/1996 | Tanaka et al. ................ | 501/92 |

FOREIGN PATENT DOCUMENTS

| | | |
|---|---|---|
| EP | 0 247 718 A1 | 12/1987 |
| EP | 0 397 464 A1 | 11/1990 |
| EP | 0 441 571 A2 | 8/1991 |
| EP | 0 463 882 A | 2/1992 |
| EP | 0 493 802 A1 | 7/1992 |
| EP | 1 054 577 A2 | 11/2000 |
| JP | 64-61356 | 3/1989 |
| JP | 3-290369 | * 12/1991 |
| JP | 5-148030 | * 6/1993 |
| JP | 5-170542 | * 7/1993 |
| JP | 6-251862 | 9/1994 |
| JP | 7-267734 | * 10/1995 |
| JP | 9-180866 | 7/1997 |
| JP | 10-25162 | 1/1998 |
| JP | 10-081568 A | 3/1998 |
| JP | 2000-001371 | * 1/2000 |

\* cited by examiner

*Primary Examiner*—John A. Jeffery
(74) *Attorney, Agent, or Firm*—Sughrue Mion, PLLC

(57) ABSTRACT

A silicon nitride sintered material containing silicon nitride, a Group 4a through 6a element, a rare earth element, and silicon carbide, characterized in that the amount of the rare earth element as reduced to a certain oxide thereof is 5.7–10.3 mol %; the ratio by mol of subtraction remainder oxygen amount calculated in relation to the oxygen contained in the sintered material, the remainder oxygen amount being expressed in terms of silicon dioxide, to the amount of oxygen contained in the sintered material is at least 0.50 and less than 0.70; a four-component crystalline phase of rare earth element-silicon-oxygen-nitrogen is not present; and the thermal expansion coefficient is at least 3.7 ppm/° C. between room temperature and 1,000° C.

22 Claims, 2 Drawing Sheets

SILICON NITRIDE SINTERED MATERIAL AND PRODUCTION PROCESS THEREOF

BACKGROUND OF THE INVENTION

1. Field of the Invention

The present invention relates to a silicon nitride sintered material and to a production process thereof, and more particularly to a silicon nitride sintered material which exhibits excellent mechanical characteristics and anti-corrosion property, which has a high thermal expansion coefficient, and which has high heat resistance so as to make the sintered material suitable for use as an insulating material such as a base material used in a ceramic glow plugs, as well as to a production process thereof.

2. Description of the Related Art

Silicon nitride sintered material, having excellent mechanical characteristics and heat resistance, has been employed as an insulating material for use in ceramic heaters in which a resistance heater is embedded or for use in similar products. In this case, increase in the weight of silicon nitride sintered material through oxidation is desired as low as possible, so that the sintered material attains excellent anti-corrosion property. When silicon nitride sintered material is used as an insulating material, a problem arises in that cracks are possibly generated in the insulating material during application or generation of heat, because silicon nitride has a thermal expansion coefficient lower than that of tungsten, tungsten carbide, molybdenum silicide, or a similar substance that is generally employed as a resistance heater (i.e. a resistance heating element) embedded in the insulating material. Therefore, in order to prevent generation of cracks, the thermal expansion coefficient of the insulating material must be substantially as large as that of the resistance heater. Thus, when the silicon nitride sintered material is used as an insulating material for ceramic heaters including a glow plug, the sintered material must have both excellent anti-corrosion property and a high thermal expansion coefficient.

In order to increase the thermal expansion coefficient of the insulating material, particles of high thermal expansion coefficient compounds such as rare earth element compounds, metallic carbides, metallic nitrides, metallic silicides, etc., having a thermal expansion coefficient higher than that of the silicon nitride have been conventionally incorporated into a raw material powder of silicon nitride, and have been dispersed therein. Typically, such a high thermal expansion coefficient compound incorporated into the silicon nitride sintered material is in an amount of a few % to about 30% by volume.

However, incorporation of a rare earth element compound that has a higher thermal expansion coefficient than a silicon nitride deteriorates the anti-corrosion property of the sintered material, particularly anti-corrosion property at about 1,000° C., because formation of a crystalline phase having oxy-nitride, such as an H ($RE_{20}Si_{12}N_4O_{48}$) phase, a J ($RE_4Si_2N_2O_7$) phase, or an M ($RE_2Si_3N_4O_3$) phase (RE: rare earth element) is formed during firing. Therefore, use of the sintered material as an insulating material for ceramic heaters is problematic. Thus, in order to prevent deterioration of the anti-corrosion property of the sintered material, conventionally, studies have been carried out on the compositions and particle sizes of silicon nitride raw material and sintering aids. However, obtaining silicon nitride sintered material having a high thermal expansion coefficient while maintaining excellent anti-corrosion property has remained difficult so far.

SUMMARY OF THE INVENTION

In view of the foregoing, an object of the present invention is to provide a silicon nitride sintered material which exhibits excellent mechanical characteristics and anti-corrosion property, which has a high thermal expansion coefficient and which has high heat resistance so as to make the silicon nitride sintered material suitable for use as an insulating material such as a base material for ceramic glow plugs, as well as a production process thereof.

The present inventors have performed studies on the relation of components of silicon nitride sintered material and amounts thereof vs. insulating property and thermal expansion coefficient thereof; and have found that when the amount of a rare earth element as reduced to a certain oxide thereof, the element being contained in the sintered material, is determined so as to fall within a specific range, and when the ratio by mol of subtraction remainder oxygen amount as calculated in relation to the oxygen contained in the sintered material, the remainder oxygen amount being expressed in terms of silicon dioxide, to the amount of oxygen contained in the sintered material is determined so as to fall within a specific range, the silicon nitride sintered material has a high thermal expansion coefficient, and exhibits excellent anti-corrosion property and mechanical characteristics. The present invention has been accomplished on the basis of this finding.

The present invention provides a silicon nitride sintered material comprising silicon nitride, any of Group 4a through 6a elements, a rare earth element, and silicon carbide, characterized in that the amount of the rare earth element as reduced to a certain oxide thereof is 5.7–10.3 mol %, and the ratio by mol of subtraction remainder oxygen amount as calculated in relation to the oxygen contained in the sintered material, the remainder oxygen amount being expressed in terms of silicon dioxide, to the amount of oxygen contained in the sintered material is at least 0.50 and less than 0.70.

The present invention also provides a silicon nitride sintered material comprising silicon nitride, any of Group 4a through 6a elements, a rare earth element, and silicon carbide, characterized in that the amount of the rare earth element as reduced to a certain oxide thereof is 15–26 mass %, the amount of said any of Group 4a through 6a elements as reduced to a certain oxide thereof is 5–13.5 mass %, and the amount of the silicon carbide is 0.8–3 mass %.

The present invention also provides a silicon nitride sintered material comprising silicon nitride, any of Group 4a through 6a elements, a rare earth element, and silicon carbide, characterized in that the amount of the rare earth element as reduced to a certain oxide thereof is 5.7–10.3 mol %, and a crystalline phase of the sintered material contains no J phase.

The present invention also provides a silicon nitride sintered material comprising silicon nitride, any of Group 4a through 6a elements, a rare earth element, and silicon carbide, characterized in that the ratio by mol of subtraction remainder oxygen amount as calculated in relation to the oxygen contained in the sintered material, the remainder oxygen amount being expressed in terms of silicon dioxide, to the amount of oxygen contained in the sintered material is at least 0.50 and less than 0.70, and a crystalline phase of the sintered material contains no J phase.

The present invention also provides a silicon nitride sintered material produced by firing a raw material powder mixture containing silicon nitride powder, powder of a rare earth element compound, powder of a compound of any of Group 4a through 6a elements, and silicon carbide powder, wherein the amount of the rare earth element as reduced to a certain oxide thereof is 15–26 mass %, and the amount of said any of Group 4a through 6a elements as reduced to a certain oxide thereof is 5–13.5 mass %.

The present invention also provides a process for producing a silicon nitride sintered material, characterized by preparing a raw material powder mixture by mixing silicon nitride powder, powder of a rare earth element compound, powder of a compound of any of Group 4a through 6a elements, and silicon carbide powder, such that the amount of the rare earth element as reduced to a certain oxide thereof is 15–26 mass %, and the amount of said any of Group 4a through 6a elements as reduced to a certain oxide thereof is 5–13.5 mass %; and firing the raw material powder mixture.

In the silicon nitride sintered material of the present invention, examples of the aforementioned "Group 4a through 6a element" include Ti, Ta, Mo, W, and Cr. Of these, Cr is particularly preferred. No particular limitation is imposed on the amount of the Group 4a through 6a element contained in the sintered material, and the amount of the Group 4a through 6a element is usually 5–13.5 mass %, preferably 6–10 mass %, more preferably 6.5–10 mass %, as reduced to a certain oxide thereof. When the amount of the element falls within the above ranges, the mechanical characteristics at high temperatures can be improved.

Examples of the aforementioned "rare earth element" contained in the silicon nitride sintered material of the present invention include Eu, Sm, Y, Sc, La, Ce, Pr, Nd, Gd, Tb, Dy, Er, and Yb. In the sintered material of the present invention, the aforementioned "the amount of the rare earth element as reduced to a certain oxide thereof" is usually 5.7–10.3 mol %, preferably 6–9.5 mol %, more preferably 6–9 mol %. When the amount of the rare earth element as reduced to a certain oxide thereof is less than 5.7 mol %, since the thermal expansion coefficient of the silicon nitride sintered material decreases, cracks are generated in an insulating material as a result of the difference in thermal expansion coefficient between the insulating material and a resistance heater during application of heat or generation of heat, which is not preferable. In contrast, when the amount of the rare earth element as reduced to a certain oxide thereof exceeds 10.3 mol %, the anti-corrosion property and flexural strength of the silicon nitride sintered material are impaired, which, again, is not preferable. As used herein, "the amount of a rare earth element as reduced to a certain oxide thereof" refers to the amount of a rare earth element contained in the sintered material as reduced to $RE_2O_3$ (RE: rare earth element). The rare earth element content is 15–26 mass %, preferably 15–25 mass %, more preferably 16–24 mass %, much more preferably 17–24 mass %, as reduced to a certain oxide thereof. When the rare earth element content falls within the above ranges, the mechanical characteristics at high temperatures can be improved.

In the silicon nitride sintered material of the present invention, the aforementioned "subtraction remainder oxygen amount as calculated in relation to the oxygen contained in the sintered material" refers to the amount of oxygen (which amount is obtained by subtracting, from the amount of oxygen contained in the sintered material, the amount of oxygen that is contained in corresponding oxides of rare earth elements contained in the sintered material when the rare earth elements are expressed as the oxide) as expressed in terms of silicon dioxide ($SiO_2$). In the silicon nitride sintered material of the present invention, the ratio by mol of the remainder oxygen amount in relation to the sintered material as reduced to silicon dioxide to the amount of oxygen contained in the sintered material (i.e., $SiO_2/[SiO_2+RE_2O_3]$, RE: rare earth element) is at least 0.50 and less than 0.70, preferably 0.50–0.695. When the ratio is less than 0.50, anti-corrosion property is deteriorated, which is not preferable, whereas when the ratio is 0.70 or more, further improvement of anti-corrosion property is difficult, and flexural strength is lowered, resulting in lowering of strength of the sintered material, which is not preferable.

No particular limitation is imposed on the amount of the aforementioned "silicon carbide" contained in the silicon nitride sintered material of the present invention, but the amount is usually 0.8–3 mass %, preferably 1–3 mass %, more preferably 1.5–2.5 mass %. When the amount falls within the above ranges, lowering of insulation resistance, which is attributed to conductivity of silicon carbide, is prevented. In addition, aciculation of particles of silicon nitride, which is an insulating substance, is prevented, and therefore the specific surface area of the silicon nitride particles increases, resulting in prevention of formation of paths for conduction of electricity by conductive particles of a high thermal expansion coefficient compound.

The silicon nitride sintered material of the present invention contains a rare earth element, but does not contain a four-component crystalline phase of rare earth element-silicon-oxygen-nitrogen. Examples of the aforementioned "four-component crystalline phase of rare earth element-silicon-oxygen-nitrogen" include an H ($RE_{20}Si_{12}N_4O_{48}$) phase, a J ($RE_4Si_2N_2O_7$) phase, and an M ($RE_2Si_3N_4O_3$) phase (RE: rare earth element) as defined by JCPDS (Joint Committee On Powder Diffraction Standards). Although a crystalline phase such as the H phase, J phase, and M phase, particularly the phase, has a high thermal expansion coefficient, the crystalline phase causes deterioration of anti-corrosion property of the sintered material, particularly anti-corrosion property at about 1,000° C., due to the crystalline phase containing oxy-nitrogen that is decomposed into oxygen and nitrogen at such high temperature. Therefore, when the silicon nitride sintered material does not contain "a four-component crystalline phase of rare earth element-silicon-oxygen-nitrogen," the sintered material can maintain excellent anti-corrosion property (i.e. corrosion resistance at high temperature). Other crystalline phases such as mono-silicate phase ($RESiO_5$) not containing oxy-nitrogen do not aggravate the corrosion resistance.

The silicon nitride sintered material of the present invention, having the aforementioned structure and, exhibits excellent mechanical characteristics and anti-corrosion property, and has a high thermal expansion coefficient. Specifically, the thermal expansion coefficient of the silicon nitride sintered material is usually at least 3.7 ppm/° C., preferably at least 3.8 ppm/° C., more preferably at least 3.85 ppm/° C., between room temperature and 1,000° C. When the thermal expansion coefficient is less than 3.7 ppm/° C., in a case where the sintered material is used as an insulating material such as a base material of ceramic glow plugs, cracks are generated in the insulating material during application or generation of heat, because of poor thermal expansion of the sintered material, and such cracks are attributed to the difference in thermal expansion coefficient between the insulating material and a resistance heater formed from tungsten, tungsten carbide, molybdenum silicide, or similar material. The flexural strength of the sintered material as measured by means of a four-point flexural strength test according to JIS R1601 (1981) is at least 750 MPa, preferably at least 800 MPa, more preferably at least 900 MPa. The anti-corrosion property (increase in the weight through oxidation) of the sintered material as measured by means of a method described in the Embodiments below is 0.04 mg/cm$^2$ or less, preferably 0.3 mg/cm$^2$.

No particular limitation is imposed on the production process for the silicon nitride sintered material of the present invention, but the sintered material can generally be produced as follows: a raw material powder mixture is prepared by mixing silicon nitride powder, powder of a rare earth element compound, powder of a Group 4a through 6a element compound, and silicon carbide powder, such that the amount of the rare earth element as reduced to a certain oxide thereof is 15–26 mass %, and the amount of the Group 4a through 6a element as reduced to a certain oxide thereof is 5–13.5 mass %; and subsequently the raw material powder mixture is fired. No particular limitation is imposed on the aforementioned "rare earth element compound" and "Group 4a through 6a element compound," so long as the former contains a rare earth element and the latter contains a Group 4a through 6a element. Typical examples of "the rare earth element compound" employed include a certain oxide of a rare earth element ($RE_2O_3$, RE: rare earth element). Typical examples of "the Group 4a through 6a element compound" employed include silicides ($CrSi_2$, $Cr_5Si_3$, etc.) and oxides of the element. No particular limitation is imposed on the particle size of the aforementioned "silicon carbide powder" to be incorporated, but the average particle size is usually 1 μm or less, preferably 0.7 μm or less, more preferably 0.1–0.7 μm. When the average particle size falls within the above ranges, the specific surface area of the silicon carbide increases, and the silicon carbide greatly exerts the effect of preventing aciculation of silicon nitride particles. The average particle size of the silicon carbide refers to the average particle size of incorporated silicon carbide raw material, provided that grains are not formed from silicon carbide particles through sintering.

No particular limitation is imposed on the firing method and firing conditions for producing the silicon nitride sintered material of the present invention, so long as the sintered material can be produced. Firing may be carried out at ambient pressure or at high pressure. The firing temperature is usually 1,650–1,950° C. In order to prevent decomposition of silicon nitride, firing is usually carried out in a non-oxidizing gas atmosphere containing nitrogen.

BRIEF DESCRIPTION OF THE DRAWINGS

Embodiments of the present invention will now be described, by way of example only, with reference to the accompanying drawings, in which.

DESCRIPTION OF THE PREFERRED EMBODIMENTS

The present invention will next be described in detail by way of Examples and Comparative Examples. However, the present invention should not be construed as being limited thereto.

(1) Preparation of Silicon Nitride Sintered Material

Figure 1:
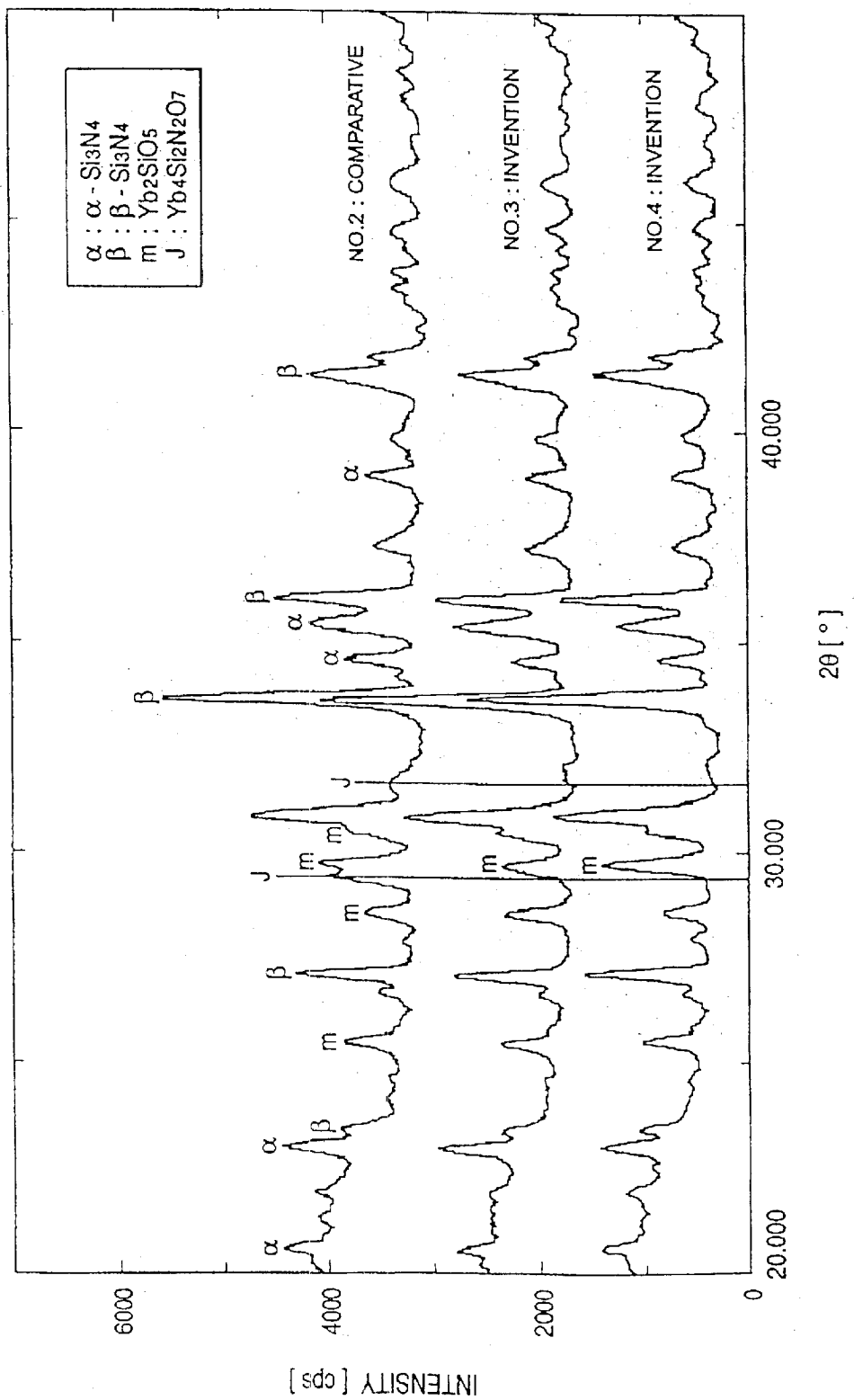
FIG. 1 is a view of X-ray charts of sintered materials Nos. 2 through 4 of the Embodiments.

Silicon nitride powder (average particle size: 0.7 μm), $Yb_2O_3$ (average particle size: 1.0 μm), which is a rare earth element; powder of Cr compounds ($Cr_2O_3$ and $CrSi_2$) (average particle size: 1.0 μm); and silicon carbide powder having an α crystal structure (average particle size: 1.0 μm) were mixed together so as to attain a formulation shown in Table 1, to thereby prepare a powder mixture (note: in Table 1, results shown in the columns "crystalline phase" and "$SiO_2/(SiO_2+RE_2O_3)$" represent the results as measured on sintered materials). The powder mixture was wet-mixed in water for 40 hours by use of silicon nitride grinding balls, and then dried in a hot water bath. Thereafter, the resultant powder mixture was fired for 0.5 hours through hot pressing in a nitrogen atmosphere at 1,800° C. and 25 MPa, to thereby yield a sintered material having dimensions 35 mm×35 mm×5 mm (sintered materials Nos. 1 through 16). FIG. 1 shows X-ray charts of sintered materials Nos. 2 through 4. As shown in Table 1, sintered materials Nos. 3, 4, 7, 8, 11, and 12 (i.e., Examples) fall within the scope of the present invention, and sintered materials of sample Nos. marked with * are Comparative Examples. In FIG. 1, the uppermost, the intermediate, and the lowermost charts represent the X-ray charts of sintered material Nos. 2, 3, and 4, respectively.

TABLE 1

| Sample No. | $Si_3N_4$ (mol %) | $Si_3N_4$ (mass %) | Cr (mol %) | Cr (mass %) | SiC (mol %) | SiC (mass %) | $RE_2O_3$ (mol %) | $RE_2O_3$ (mass %) | $SiO_2$ (mol %) | $SiO_2$ (mass %) | Crystalline phase | $SiO_2/(SiO_2+RE_2O_3)$ |
|---|---|---|---|---|---|---|---|---|---|---|---|---|
| *1 | 74.2 | 73.1 | 12.5 | 9.8 | 7.9 | 2.2 | 5.4 | 14.9 | 0 | 0 | Monosilicate | 0.59 |
| *2 | 72.0 | 71.1 | 12.7 | 9.6 | 9.3 | 2.6 | 6.0 | 16.7 | 0 | 0 | J-Monosilicate | 0.49 |
| 3 | 71.8 | 71.0 | 12.6 | 9.6 | 9.3 | 2.6 | 6.0 | 16.7 | 0.2 | 0.1 | Monosilicate | 0.50 |
| 4 | 71.4 | 70.6 | 11.1 | 8.7 | 5.4 | 1.5 | 6.0 | 16.6 | 6.2 | 2.6 | Monosilicate | 0.69 |
| *5 | 71.0 | 70.3 | 11.2 | 8.8 | 5.4 | 1.5 | 6.0 | 16.7 | 6.4 | 2.7 | Monosilicate | 0.70 |
| *6 | 70.6 | 66.7 | 13.1 | 9.8 | 8.2 | 2.2 | 8.0 | 21.3 | 0 | 0 | J | 0.49 |
| 7 | 70.5 | 66.6 | 13.0 | 9.8 | 8.2 | 2.2 | 8.0 | 21.3 | 0.2 | 0.1 | Monosilicate | 0.50 |
| 8 | 67.4 | 64.8 | 11.2 | 8.8 | 4.8 | 1.3 | 8.0 | 21.6 | 8.6 | 3.5 | Monosilicate | 0.69 |
| *9 | 66.9 | 64.5 | 11.1 | 8.8 | 4.8 | 1.3 | 7.9 | 21.5 | 9.3 | 3.9 | Monosilicate | 0.70 |
| *10 | 72.8 | 65.6 | 11.4 | 8.2 | 5.3 | 1.4 | 9.7 | 24.6 | 0.7 | 0.3 | J | 0.49 |
| 11 | 71.8 | 64.6 | 11.5 | 8.2 | 5.3 | 1.4 | 9.9 | 25.2 | 1.4 | 0.5 | Monosilicate | 0.50 |
| 12 | 66.4 | 61.9 | 9.6 | 7.5 | 3.3 | 0.90 | 9.6 | 25.2 | 11.1 | 4.4 | Monosilicate | 0.69 |
| *13 | 65.5 | 61.3 | 9.4 | 7.4 | 3.3 | 0.90 | 9.6 | 25.4 | 12.2 | 4.9 | Monosilicate | 0.70 |
| *14 | 66.5 | 61.0 | 11.7 | 8.5 | 7.4 | 1.9 | 10.5 | 27.0 | 3.9 | 1.5 | J | 0.50 |
| *15 | 56.4 | 54.5 | 10.9 | 8.9 | 8.1 | 2.2 | 10.5 | 28.6 | 14.0 | 5.8 | J-Monosilicate | 0.69 |
| *16 | 56.2 | 54.4 | 10.9 | 8.9 | 8.1 | 2.2 | 10.5 | 28.5 | 14.4 | 6.0 | Monosilicate | 0.70 |

(2) Performance Test

Each of the sintered materials Nos. 1 through 16 produced in (1) was subjected to measurement of thermal expansion coefficient, anti-corrosion property, and flexural strength. The results are shown in Table 2. In order to obtain thermal expansion coefficient (ppm/° C.), each of the sintered materials Nos. 1 through 16 was formed into a test piece having dimensions of 3.0 mm ×4.0 mm×15.0 mm, and the length of the test piece was measured in a nitrogen atmosphere at temperatures between room temperature and 1,000° C. The thermal expansion coefficient was calculated from the thus-measured length by means of the below-described formula. In order to obtain anti-corrosion property (increase in the weight through oxidation) (mg/cm⁻), each of the sintered materials Nos. 1 through 16 was formed into a test piece having dimensions of 3 mm×4 mm×35 mm, and the weight of the test piece was measured before and after heating in air for 100 hours at 1,000° C. The anti-corrosion property was obtained by means of the below-described formula. In order to obtain flexural strength (MPa), each of the sintered materials Nos. 1 through 16 was formed into a test piece having dimensions of 3 mm×4 mm×35 mm, and the four-point flexural strength of the test piece was measured according to JIS R1601 (1981). As shown in Table 2, sintered materials Nos. 3, 4, 7, 8, 11, and 12 (i.e., Examples) fall within the scope of the present invention, and sintered materials of sample Nos. marked with * are Comparative Examples.

$$D=-\{(A-B)/[C\times(1,000-30)]\}+8.45\times10^{-6}$$

A: Standard sample length (mm) at 1,000° C.

B: Measurement sample length (mm) at 1,000° C.

C: Measurement sample length (mm) at 30° C.

D: Thermal expansion coefficient

Anti-corrosion property (increase in the weight through oxidation)=(E−F)/G

E: Weight of test piece after heating (mg)

F: Weight of test piece before heating (mg)

G: Surface area of test piece (cm²)

Figure 2:
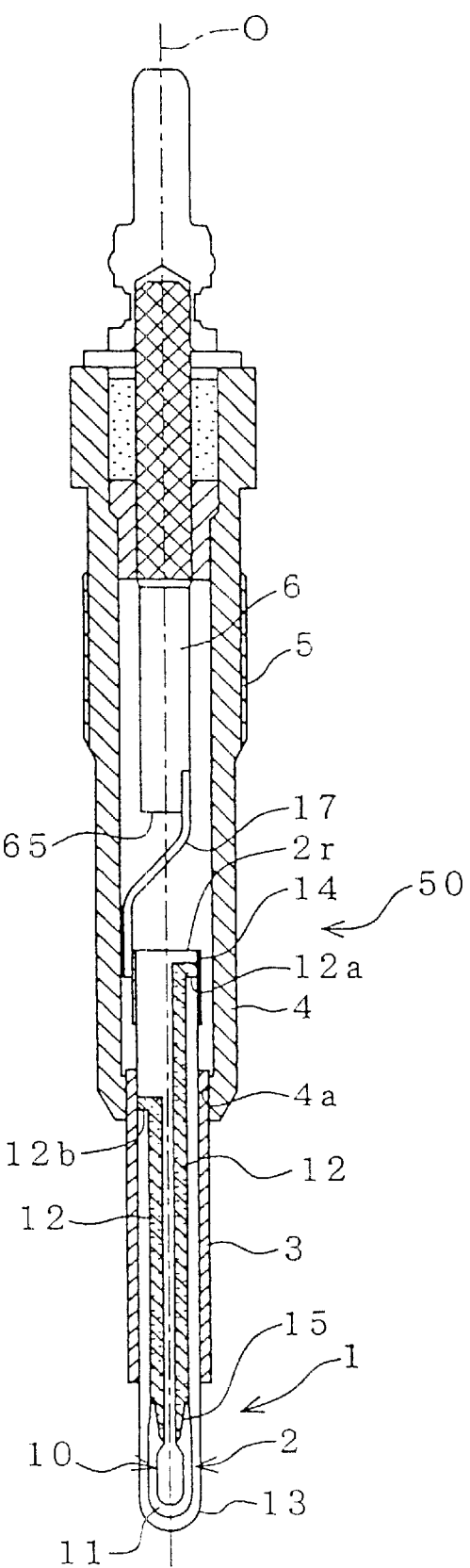
FIG. 2 is a longitudinal cross-sectional view of a glow plug incorporating a silicon nitride ceramic base member 13 and a resistance heating element 11 embedded therein.

FIG. 2 shows an example of the glow plug according to the present invention in which the construction of an inner portion thereof is illustrated. The glow plug 50 has a ceramic heater 1 and an outer metal cylinder 3 retaining the same, and a main metal member 4 joined to the metal cylinder. The ceramic heater 1 has a shape of a rod, and a resistance heating element 11 is buried in a front end portion 2 thereof. A first heater terminal 12a for supplying a current to the resistance heating element 11 is formed in an exposed state on an outer circumferential surface of a rear end portion of the heating element. The outer metal cylinder 3 is formed tubularly, and holds the ceramic heater 1 on an inner side thereof so that a rear end portion and a front end portion 2 thereof project from the metal cylinder in the axial direction O thereof. The main metal member 4 is formed tubularly so as to be joined coaxially to the outer metal cylinder 3.

The main metal member 4 is provided on an outer circumferential surface thereof with a threaded portion 5 as a fixing portion for securing the glow plug 50 to an engine block (not shown), and a metal shaft 6 is fixed to a rear end portion of the main metal member. The metal shaft 6 is formed in the shape of a rod, and inserted into an inner side of the rear end portion of the main metal member 4 in the axial direction O. The metal shaft 6 is disposed so that a front end surface 6s thereof is opposed in the axial direction O to a rear end surface 2r of the ceramic heater 1. A metal terminal ring 14 electrically connected to the first heater terminal 12a is fixed in a close fitted state on an outer circumferential surface of a rear end portion of the ceramic heater 1 so as to cover the first heater element 12a. The metal shaft 6 and first heater terminal 12a are electrically connected together via a metal lead member 17 joined at one end thereof to the terminal ring 14, and at the other end thereof to the metal shaft 6. Since the metal lead member 17 is fixed to the terminal ring 14 by metal/metal connection, a complicated structure requiring a high manday, such as a metal/ceramic material soldered structure, and a structure in which the metal lead member 17 is connected to the ceramic heater 1 by burying the former in the latter is eliminated. This enables the glow plug to be manufactured at a low cost. Since the terminal ring 14 is fitted on the ceramic heater 1 by close fitting, such a solder layer as is formed by a soldering method in a related art structure is not interposed therebetween, so that a concentricity of the metal shaft 6 and terminal ring 14 is secured easily. Owing to such a structure, the slippage of joint surfaces of the metal lead member 17 and metal shaft 6 or terminal ring 14 becomes hard to occur, and, in its turn, a joint portion of a good quality and a high strength can be formed.

A second heater terminal 12b for supplying a current to the resistance heating element 11 is formed in an exposed state on the portion of the outer circumferential surface of the ceramic heater 1 which is ahead of the first heater terminal 12a in the axial direction O. The tubular metal cylinder 3 covering and electrically connected to the second heater terminal 12b is fixed in a close fitted state on an outer circumferential surface of the ceramic heater 1 with a rear end portion of the ceramic heater 1 projected in the rearward direction thereof. The main metal member 4 is fixed at a cylindrical heater holding surface 4a thereof to the outer circumferential surface of the outer metal cylinder 3.

Owing to this structure, the outer metal cylinder 3 and terminal ring 14 are fixed in a close fitted state on both of the two heater terminals 12a, 12b used to supply a current to the ceramic heater 1. The assembled structure of the glow plug is thereby further simplified.

The second heater terminal 12b is disposed ahead of the first heater terminal 12a in the axial direction O, and the outer metal cylinder 3 is used also as a terminal ring with the main metal member 4 fixed to the outer metal cylinder 3. According to this structure, the outer metal cylinder 3 is used also as a terminal ring. This enables the number of parts to be reduced, and the glow plug according to the present invention to be provided at a lower price.

The main metal member 4 is fixed to the outer surface of the outer metal cylinder 3 to be exact. According to this arrangement, the outer metal cylinder 3 interposed between the main metal member 4 and ceramic heater 1 is used as a spacer, so that a suitable width of clearance can be formed between the outer circumferential surface of a rear end portion of the ceramic heater 1 projected rearward from the outer metal cylinder 3 and the portion of the inner circumferential surface of the main metal member 4 which is on the rear side of the heater holding surface 4a thereof. This makes it easier to provide the terminal ring 14 on the rear end portion of the ceramic heater 1.

The ceramic heater 1 is formed as a rod type ceramic heater element in which a ceramic resistor 10 is buried in a ceramic base member 13 formed of an insulating ceramic material. In this mode of embodiment, the ceramic resistor 10 is formed of a conductive ceramic material that is the silicon nitride-tungsten carbide composite sintered material as described previously according to the invention. This ceramic resistor 10 has a U-shaped first ceramic resistor portion 11 functioning as a resistance heating element embedded in a front end portion of the ceramic heater 1 and has two second ceramic resistor portions 12,12 extending in the axial direction O and embedded in a rear end portion of the ceramic heater 1. Each of the second resistor portions 12,12 is joined to an end of the U shaped first resistor at a joining interface 15. The electrical resistivity of the first resistor portion 11 is made lower than those of the second ceramic resistor portions 12,12 by using a different composition of the composite sintered material so that the temperature of the front end portion of the ceramic heater 1 is higher than that of the rear portion of the heater 1 when an electrical current flows through them. The two second resistor portions 12,12 of the ceramic resistor 10 have branching sections formed at mutually different heights in the axial direction O. The parts of these branching sections which are exposed to the surface of the ceramic heater form the first heater terminal 12a and second heater terminal 12b, respectively.

In this mode of embodiment, a silicon nitride ceramic material is employed as an insulating ceramic material constituting the ceramic base member 13. The texture of the silicon nitride ceramic material is formed by combining main phase particles, which contain silicon nitride ($Si_3N_4$) as a main component, with one another by a grain boundary phase derived from a sintering assistant component and the like which will be described below. The main phase may be a phase in which Al or O is substituted for a part of Si or N, or, furthermore, a phase in which atoms of metals, such as Li, Ca, Mg, Y, etc., are solid-dissolved.

Ten glow plug ceramic base members 13 as described above were produced from each of the sintered materials Nos. 1 through 16 having compositions shown in Table 1, and each glow plug base member 13 was subjected to an electricity-application cycle test (maximum: 10,000 cycles). The glow plug base member 13 was connected to a power source, and in each cycle, the base member 13 was heated to a saturation temperature of 1,400° C. under application of electricity for one minute, and then application of electricity was stopped for one minute. The results of the electricity-application cycle test are shown in Table 2. As shown in Table 2, when no problem arises in the ten glow plug base members 13, rating "O" is assigned; when problems arise in at least one glow plug base member 13 due to lowering of anti-corrosion property and flexural strength of the base material, rating "Δ" is assigned; and when problems arise in all ten glow plug base members 13 due to lowering of anti-corrosion property and flexural strength of the base material, rating "x" is assigned.

TABLE 2

| Sample No. | Thermal expansion coefficient (ppm/° C.) | Anti-corrosion property (mg/cm$^2$) | Flexural strength (MPa) | Electricity-application cycle |
|---|---|---|---|---|
| *1 | 3.6 | 0.01 | 1020 | Δ |
| *2 | 3.7 | 0.05 | 1030 | Δ |
| 3 | 3.7 | 0.02 | 1080 | O |
| 4 | 3.7 | 0.01 | 960 | O |
| *5 | 3.7 | 0.01 | 720 | Δ |
| *6 | 3.9 | 0.07 | 1100 | X |
| 7 | 3.9 | 0.03 | 1120 | O |
| 8 | 3.9 | 0.01 | 1050 | O |
| *9 | 3.9 | 0.01 | 780 | Δ |
| *10 | 4.1 | 0.10 | 1050 | X |
| 11 | 4.1 | 0.04 | 1050 | O |
| 12 | 4.1 | 0.02 | 920 | O |
| *13 | 4.1 | 0.01 | 680 | Δ |
| *14 | 4.1 | 0.15 | 1060 | X |
| *15 | 4.1 | 0.08 | 910 | X |
| *16 | 4.1 | 0.04 | 690 | Δ |

(3) Effects exerted by Embodiments

As is apparent from FIG. 1, the peak of the J phase is not observed in X-ray charts of the silicon nitride sintered materials Nos. 3 and 4, which within the scope of the present invention, whereas the peak of the J phase is observed in the X-ray chart of the sintered material No. 2, which falls outside the scope of the present invention; i.e., the J phase (crystalline phase)) is generated in the sintered material No. 2. In FIG. 1, m represents a crystalline phase of monosilicate (:$Yb_2SiO_5$) that does not aggravate the high temperature corrosion resistance of the sintered silicon nitride.

As is apparent from Tables 1 and 2, in the sintered materials Nos. 14 and 15, in which the rare earth element oxide content is as high as 10.5 mol % (27.0 mass % or more), the J phase (crystalline phase) is generated, and increases in the weight through oxidation are as high as 0.15 mg/cm$^2$ and 0.08 mg/cm$^2$, respectively. Briefly, the sintered materials Nos. 14 and 15 exhibit poor anti-corrosion property. In the sintered material No. 16, in which the rare earth element oxide content is as high as 10.5 mol % and the ratio by mol of $SiO_2/(SiO_2+RE_2O_3)$ is as high as 0.70, generation of the J phase is prevented, and an increase in weight through oxidation is as low as 0.04 mg/cm$^2$. Therefore, the sintered material No. 16 is improved in terms of anti-corrosion property as compared with the sintered materials Nos. 14 and 15. However, the sintered material No. 16 has a considerably low flexural strength (690 MPa); i.e., exhibits poor strength.

The sintered materials Nos. 2, 6, and 10, in which the ratio by mol of $SiO_2/(SiO_2+RE_2O_3)$ is 0.49, have a flexural strength of as high as 1,030–1,100 MPa; i.e., exhibit excellent strength. However, in the sintered materials Nos. 2, 6, and 10, the J phase (crystalline phase) is generated, and an increase in the weight through oxidation is as high as 0.05–0.10 mg/cm$^2$. Briefly, the sintered materials Nos. 2, 6, and 10 exhibit poor anti-corrosion property. The sintered materials Nos. 5, 9, and 13, in which the ratio by mol of $SiO_2/(SiO_2+RE_2O_3)$ is 0.70, exhibit an increase in weight through oxidation as low as 0.01 mg/cm$^2$; i.e., exhibit excellent anti-corrosion property. However, the sintered materials Nos. 5, 9, and 13 have a flexural strength of as low as 680–780 MPa; i.e., exhibit poor strength.

In contrast, in the sintered materials Nos. 3, 4, 7, 8, 11, and 12, in which the amount of a rare earth element oxide is 6–10 mol % and the ratio by mol of $SiO_2/(SiO_2+RE_2O_3)$ is 0.50–0.69, generation of a crystalline phase (e.g., J phase) from the rare earth element oxide is prevented, the thermal expansion coefficient is as high as 3.7 ppm/° C., an increase in the weight through oxidation is as low as 0.01–0.03 mg/cm$^2$, and the flexural strength is as high as 920–1,120 MPa. Briefly, the sintered materials Nos. 3, 4, 7, 8, 11, and 12 exhibit excellent anti-corrosion property and high strength.

As shown in Table 2, the results of the electricity-application cycle test of the glow plug base members 13 produced from the sintered materials Nos. 1 through 16 shown in Table 1 show that the glow plug base members 13 produced from sintered materials Nos. 3, 4, 7, 8, 11, and 12, which fall within the scope of the present invention, exhibited no problem, whereas the glow plug base members 13 produced from sintered materials Nos. 1, 2, 5, 6, 9, 10, and 13 through 16, which fall outside the scope of the present invention, had problems. The test results show that the glow plug base members 13 produced from the silicon nitride sintered materials which fall within the scope of the present invention exhibit excellent durability in the electricity-application cycle test, whereas the glow plug elements produced from the silicon nitride sintered materials which fall outside the scope of the present invention exhibit poor durability due to lowering of anti-corrosion property and flexural strength of the base material.

The present invention is not limited to the aforementioned Examples, and various modifications may be made in accordance with purposes and uses.

According to the present invention, a silicon nitride sintered material can be produced having a high thermal expansion coefficient, with excellent anti-corrosion property and mechanical characteristics being maintained, without use of special techniques and materials. This is because the amount of a rare earth element as reduced to a certain oxide thereof and the ratio by mol of subtraction remainder oxygen amount in relation to the sintered material, the oxygen amount being expressed in terms of silicon dioxide, to the amount of oxygen contained in the sintered material are determined so as to fall within specific ranges. Therefore, the silicon nitride sintered material of the present invention has a high thermal expansion coefficient, and is suitable for use as a base material for ceramic glow plugs, which material requires excellent anti-corrosion property and mechanical characteristics. According to the production process of a silicon nitride sintered material of the present invention, a silicon nitride sintered material can be produced exhibiting the aforementioned excellent characteristics.

This application is based on Japanese Patent Application No. 2001-67323 filed Mar. 9, 2001, the disclosure of which is incorporated herein by reference in its entirety.

What is claimed is:

1. A silicon nitride sintered material comprising silicon nitride, at least one element selected from the group consisting of Group 4a through 6a elements, a rare earth element, and silicon carbide, characterized in that prior to sintering the amount of the rare earth element as reduced to an oxide thereof is 5.7–10.3 mol %, and in the sintered material the ratio by mol of the amount of silicon dioxide to the amount of all oxygen containing compounds in the sintered material is at least 0.50 and less than 0.70.

2. The silicon nitride sintered material as claimed in claim 1, wherein the sintered material has no four-component crystalline phase of: rare earth element, silicon, oxygen and nitrogen.

3. The silicon nitride sintered material as claimed in claim 2, wherein the four-component crystalline phase is a J phase.

4. The silicon nitride sintered material as claimed in claim 1, which has a thermal expansion coefficient of at least 3.7 ppm/° C. between room temperature and 1,000° C.

5. A glow plug comprising:
a ceramic base member comprising the silicon nitride sintered material of claim 1.

6. A silicon nitride sintered material comprising silicon nitride, at least one element selected from the group consisting of Group 4a through 6a elements, a rare earth element, and silicon carbide, characterized in that prior to sintering the amount of the rare earth element as reduced to an oxide thereof is 15–26 mass %, the amount of said at least one element selected from the group consisting of Group 4a through 6a elements as reduced to an oxide thereof is 5–13.5 mass %, and the amount of the silicon carbide is 0.8–3 mass %.

7. The silicon nitride sintered material as claimed in claim 6, wherein the sintered material has no four-component crystalline phase of: rare earth element, silicon, oxygen and nitrogen.

8. The silicon nitride sintered material as claimed in claim 7, wherein the four-component crystalline phase is a J phase.

9. The silicon nitride sintered material as claimed in claim 6, which has a thermal expansion coefficient of at least 3.7 ppm/° C. between room temperature and 1,000° C.

10. A glow plug comprising:
a ceramic base member comprising the silicon nitride sintered material of claim 6.

11. A silicon nitride sintered material comprising silicon nitride, at least one element selected from the group consisting of Group 4a through 6a elements, a rare earth element, and silicon carbide, characterized in that prior to sintering the amount of the rare earth element as reduced to an oxide thereof is 5.7–10.3 mol %, and the sintered material contains no crystalline J phase.

12. The silicon nitride sintered material as claimed in claim 11, which has a thermal expansion coefficient of at least 3.7 ppm/° C. between room temperature and 1,000° C.

13. A glow plug comprising:
a ceramic base member comprising the silicon nitride sintered material of claim 11.

14. A silicon nitride sintered material comprising silicon nitride, at least one element selected from the group consisting of Group 4a through 6a elements, a rare earth element, and silicon carbide, characterized in that in the sintered material the ratio by mol of the amount of silicon dioxide to the amount of all oxygen containing compounds in the sintered material is at least 0.50 and less than 0.70, and the sintered material contains no crystalline J phase.

15. The silicon nitride sintered material as claimed in claim 14, which has a thermal expansion coefficient of at least 3.7 ppm/° C between room temperature and 1,000° C.

16. A glow plug comprising:
a ceramic base member comprising the silicon nitride sintered material of claim 14.

17. A glow plug as claimed in claim 16, further comprising:
a resistance heating element made of tungsten, tungsten carbide, or molybdenum silicide, the resistance heating element being embedded in the ceramic base member.

18. A silicon nitride sintered material produced by firing a raw material powder mixture containing silicon nitride powder, powder of a rare earth element compound, powder of a compound of at least one element selected from the group consisting of Group 4a through 6a elements, and silicon carbide powder, wherein the amount of the rare earth element as reduced to an oxide thereof is 15–26 mass %, and the amount of said at least one element selected from the group consisting of Group 4a through 6a elements as reduced to an oxide thereof is 5–13.5 mass %.

19. The silicon nitride sintered material as claimed in claim 18, which has a thermal expansion coefficient of at least 3.7 ppm/° C. between room temperature and 1,000° C.

20. A glow plug comprising:
a ceramic base member comprising the silicon nitride sintered material of claim 18.

21. A process for producing a silicon nitride sintered material, which comprises preparing a raw material powder mixture by mixing silicon nitride powder, powder of a rare earth element compound, powder of a compound of at least one element selected from the group consisting of Group 4a through 6a elements, and silicon carbide powder, such that the amount of the rare earth element as reduced to an oxide thereof is 15–26 mass %, and the amount of said at least one element selected from the group consisting of Group 4a through 6a elements as reduced to an oxide thereof is 5–13.5 mass %; and firing the raw material powder mixture.

22. A glow plug comprising:
a ceramic base member comprising the silicon nitride sintered material produced by the process of claim 20.

* * * * *